United States Patent
Carruesco Llorens et al.

(10) Patent No.: US 11,003,166 B2
(45) Date of Patent: May 11, 2021

(54) SUB-VOLUME OCTREES

(71) Applicant: HEWLETT-PACKARD DEVELOPMENT COMPANY, L.P., Spring, TX (US)

(72) Inventors: Alex Carruesco Llorens, Sant Cugat del Valles (ES); Alvar Vinacua, Sant Cugat del Valles (ES); Pere Brunet, Sant Cugat del Valles (ES); Sergio Gonzalez, Sant Cugat del Valles (ES); Jordi Gonzalez Rogel, Sant Cugat del Valles (ES); Marc Comino, Sant Cugat del Valles (ES); Josep Giralt Adroher, Sant Cugat del Valles (ES); Lluis Abello Rosello, Sant Cugat del Valles (ES); Sebastia Cortes I Herms, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 42 days.

(21) Appl. No.: 16/339,824

(22) PCT Filed: Oct. 12, 2016

(86) PCT No.: PCT/US2016/056568
§ 371 (c)(1),
(2) Date: Apr. 5, 2019

(87) PCT Pub. No.: WO2018/071013
PCT Pub. Date: Apr. 19, 2018

(65) Prior Publication Data
US 2020/0050175 A1    Feb. 13, 2020

(51) Int. Cl.
*G06T 17/00*    (2006.01)
*G05B 19/4099*  (2006.01)
(Continued)

(52) U.S. Cl.
CPC .......... *G05B 19/4099* (2013.01); *B33Y 50/00* (2014.12); *G06T 15/08* (2013.01);
(Continued)

(58) Field of Classification Search
None
See application file for complete search history.

(56) References Cited

U.S. PATENT DOCUMENTS

| 4,694,404 A | 9/1987 | Meagher |
| 8,169,434 B2 | 5/2012 | Zhou et al. |
| (Continued) | | |

FOREIGN PATENT DOCUMENTS

| EP | 2933777 A1 | 10/2015 |
| JP | 60237578 | 11/1985 |
| (Continued) | | |

OTHER PUBLICATIONS

Marta, F. et al., Octree-based View-Dependent Triangle Meshes, 2007, < https://otik.uk.zcu.cz/bitstream/handle/11025/11010/Fairen.pdf?sequence=1 > (8 pages).

(Continued)

*Primary Examiner* — Yi Wang
(74) *Attorney, Agent, or Firm* — HP Inc. Patent Department

(57) ABSTRACT

In an example, a method includes receiving a first data model of an object to be generated in additive manufacturing, at a processor. Using the processor, a second data model may be determined. Determining the second data model may include generating for each of plurality of contiguous, non-overlapping sub-volumes of a volume containing the object, a sub-volume octree characterising the sub-volume and having a root node. Determining the second data model may further include generating a volume octree characterising the volume containing the object, the volume octree (Continued)

characterising in its lowest nodes the root nodes of the sub-volume octrees.

18 Claims, 4 Drawing Sheets

(51) Int. Cl.
    *B33Y 50/00*     (2015.01)
    *G06T 15/08*     (2011.01)

(52) U.S. Cl.
    CPC .. *G06T 17/005* (2013.01); *G05B 2219/35134* (2013.01); *G05B 2219/49023* (2013.01)

(56) References Cited

U.S. PATENT DOCUMENTS

| | | |
|---|---|---|
| 8,780,112 B2 | 7/2014 | Kontkanen et al. |
| 2012/0320073 A1 | 12/2012 | Mason |
| 2013/0034309 A1 | 2/2013 | Nystad et al. |
| 2013/0235050 A1 | 9/2013 | Karras |
| 2015/0148930 A1* | 5/2015 | Kumar ............... G05B 19/4099 700/98 |
| 2015/0262416 A1 | 9/2015 | Hecht |
| 2017/0148211 A1* | 5/2017 | Zakhor ................ G06T 15/205 |

FOREIGN PATENT DOCUMENTS

| | | |
|---|---|---|
| JP | 08153214 | 6/1996 |
| JP | 2000182081 | 6/2000 |

OTHER PUBLICATIONS

Yemez, Y. et al., Abstract Only, Progressive Multilevel Meshes from Octree Particles , 1999, < http://dl.acm.org/citation.cfm?id=1889755 > (1 page).

\* cited by examiner

SUB-VOLUME OCTREES

BACKGROUND

Additive manufacturing techniques may generate a three-dimensional object on a layer-by-layer basis through the selective solidification of a build material. In examples of such techniques, build material is supplied in a layer-wise manner and a solidification method may include heating the layers of build material to cause melting in selected regions, for example in regions bearing a fusing agent. In other techniques, other solidification methods, such as chemical solidification methods or binding materials, may be used.

Data relating to a three-dimensional object to be generated may be provided to an additive manufacturing apparatus and used to generate the three-dimensional object.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and be processed layer by layer, for example within a fabrication chamber.

In some examples, selective solidification is achieved through directional application of energy, for example using a laser or electron beam which results in solidification of build material where the directional energy is applied.

In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner. A coalescence modifying agent (also referred to as modifying or detailing agents), which acts to modify the effects of a fusing agent for example by reducing or increasing coalescence or to assist in producing a particular finish or appearance to an object, and such agents may therefore be termed detailing agents may also be used as a print agent in some examples. A coloring agent, for example comprising a dye or colorant, may in some examples be used as a fusing agent or a modifying agent, and/or as a print agent to provide a particular color for the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

When modelling large and complex parts at a high resolution, data models can quickly become large.

Figure 1:
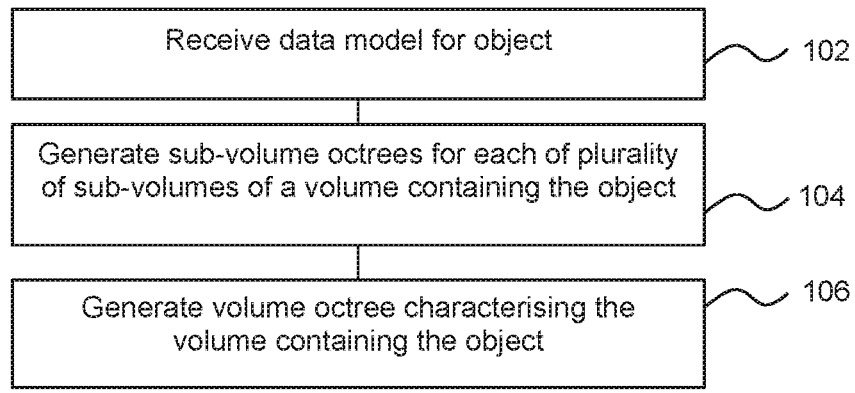
FIG. 1 is a flowchart of an example method for generating data representing a three-dimensional object.

FIG. 1 is a flowchart of a method, which may be a computer implemented method, comprising, in block 102 receiving a first data model of an object, which may be an object to be generated in additive manufacturing.

In some examples, this data may be provided as an octree representation of at least part of an object to be manufactured in a layer-by-layer manufacturing process as a plurality of nodes, for example a classical octree representation, in which the node representing the largest volume (the 'root' node) is described first, followed its octants, follow by their octants and so on. In some examples, the data may provide the representation of the object, as a design file, such as a STL file, a .OBJ file, a DXF file, a json file, a 3mf file, a vtk file, or the like. The object may be represented as a mesh (e.g. a polygon mesh), or in a series of slices. In some examples, the representation may comprise a print resolution representation of the data, for example comprising a specification of at least one attribute (for example, present or absent, a color, a texture, a transparency, a conductivity, a strength, a porosity, a resilience, or the like) or print material (for example, a choice of print agent or build material) for each 'voxel' of an object and/or a surrounding volume (for example, a cuboid enclosing the object). A voxel may be thought of as a volumetric pixel, any each voxel may be a print addressable area, and in some examples, voxels are defined at the print resolution of an apparatus. In some examples, each voxel is the same shape and/or size, for example comprising cubes or the same size, whereas in other examples voxels may differ in size and/or shape.

Blocks 104 and 106 comprise a method of generating a second data model. Block 104 comprises generating, for each of plurality of contiguous, non-overlapping sub-volumes of a volume containing the object, a sub-volume octree characterising the sub-volume and block 106 comprises generating a volume octree characterising the volume containing the object, the octree characterising in its lowest nodes the root nodes of the sub-volume octrees.

The terms 'volume' and 'sub-volume' in the context of volume octrees and sub-volume octrees are intended purely as identifiers, as the volume octree describes a 'whole' volume of interest and the sub-volume octrees each describe part of the volume of interest. The terms 'first' and 'second' octree could be used instead.

Figure 2:
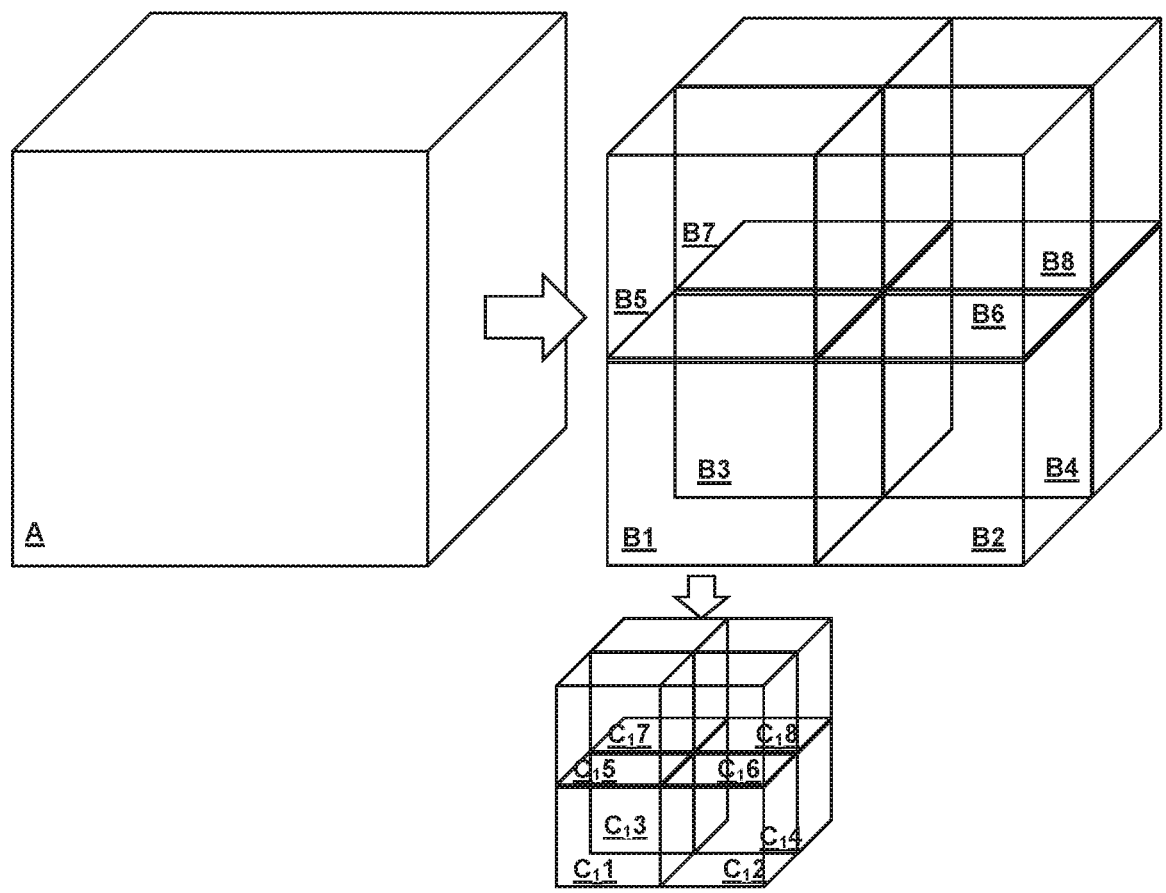
FIG. 2 is a schematic drawing illustrating an octree structure.

A representation of a 3-level octree shown in FIG. 2. In FIG. 2, the root node A is a single volume. The next level splits this volume in to octants B1-8, each of which represents a physical sub-volume. B1, B2, B3 and B4 represent quadrants of the lower half of the volume whereas B5, B6, B7 and B8 relate to the upper half of the volume. FIG. 2 also shows the next level, but for the purposes of simplicity of illustration, this is shown just for B1. The next level splits B1 into octants $C_1 1$ to $C_1 8$ (wherein this notation is extended below such that B2 may be split into octants labelled $C_2 1$ to $C_2 8$, and more generally Bn may be split into octants labelled $C_n 1$ to $C_n 8$), each of which represents a physical sub-volume. Again, in this example $C_n 1$-$C_n 4$ represent the lower half of each Bn volume for n=1 to 8. It will be understood that each node comprises data describing at least one aspect of the object, as is further set out below.

Although not shown, a 'D' level node may be defined, comprising each $C_n m$ (where n=1 to 8 and m=1 to 8) volume split into octants. In an example each D level node may describe eight print resolution voxels. In such an example, block 104 of FIG. 1 may comprise forming sixty four sub-volume octrees, each comprising a single C node describing its 8 sub-volumes and 512 D level nodes. Block 106 may comprise generating an octree having a root node (A, describing 8 sub-volumes), and eight B nodes (each describing 8 sub-volumes, wherein the sub-volumes each corresponds to a C node).

In this way, two 'levels' or 'orders' of octree are produced describing the object. While octrees provide an effective method of representing an object, where objects are to be described at certain resolutions, even when data compression techniques are used, the data storage and processing resources to effectively handle the models may be substantial. While, for example, 12 octree levels may be appropriate to describe an object, this may slow down processors with less than 16 Gb of RAM. As the octree grows exponentially with depth, increasing the resolution means that processing and storage resources to handle the data also increase dramatically, so the problem does not scale easily.

FIG. 1 describes a method for forming a split-level octree representation, in which volumetric space is effectively subdivided into a regular grid of sub-volume cells, and sub-volume octrees for each of these cells are built. When they have all been built, the grid is traversed to build the top levels of the global volume octree. As is described in greater detail below, the octrees may be subsequently merged.

In some examples, the object may be described by reference to an attribute. In some examples, a volume within the object may be categorised as one of: (i) having a predetermined attribute over the whole volume (i.e. every sub-volume or region thereof shares the predetermined attribute), (ii) lacking the predetermined attribute entirely (i.e. every sub-volume or region thereof lacks the predetermined attribute) or (iii) comprising a sub-region having the predetermined attribute and a sub-region lacking the predetermined attribute.

In one example, the attribute may be whether the volume comprises part of an object and each volume may be categorised as one of:
  (i) being wholly internal to the object (termed 'black'),
  (ii) being wholly external to the object (termed 'white'),
  (iii) spanning an object boundary (termed 'grey'), such that a sub region of the volume is internal to the object and another sub region is external.

In some examples, there are two possible categories for volumes scanning a boundary (or more generally comprising sub regions which have an attribute and sub regions which lack the attribute): a 'terminal grey' volume or an 'intermediate grey' volume. A terminal grey volume may be encoded when the volume is a print resolution volume, or is the smallest volume encoded by a particular model. Such grey volumes may be treated differently than intermediate grey volumes as a decision may be made as to whether to treat the volume as a black or a white volume; e.g., in practical terms, the volume is assigned to be either inside or outside the object. However, such terminal grey volumes may be omitted in some examples.

|  | $X_a$ | $X_b$ |
| --- | --- | --- |
| White | 0 | 0 |
| Black | 0 | 1 |
| Grey (Intermediate) | 1 | 0 |
| Grey (Terminal) | 1 | 1 |

In this example the categorisation of a volume is expressed with two bits: 00 for a white volume, 01 for a black volume, 10 for an intermediate grey volume and 11 for a terminal grey volume.

Each node may expressed as a 16 bit string characterising its sub-volumes. Thus, if the object occupies a slice filling the bottom of the cube, taking up the bottom quarter of the cube shown in FIG. 2, the 'A' node would have 4 'grey' volumes and four white volumes, and could be represented in terms of its sub-volumes in number order as B1{10}, B2{10}, B3{10}, B4{10}, B5{00}, B6{00}, B7{00}, B8{00}, or as:

[1010101000000000]

The B1 node has white volumes in the upper half and black (contained in the object) volumes in the lower half, so could be encoded as

[0101010100000000]

The B5 volume is white: as is further set out below, in some examples, this may mean that no B5 node is formed within the octree as there is no more information to be gained in relation to the B5 volume.

More generally, such encoding could be used to specify any binary attribute, for example, the presence or absence of a particular color, conductivity, elasticity, print agent, or the like. For example, each volume could be categorised as 'red' or 'not red' or 'containing a red sub-region and a non-red sub-region', or categorised as 'conductive' or 'not conductive' or 'containing a conductive sub-region and a non-conductive sub-region'.

In some examples, the data may be ordered in a predetermined manner, for example based on the position of the sub-volume described within the node. For example, the 'least significant bits', i.e. the bits at the end of the bit string, contain information about the sub-volumes which have smaller z coordinates, when z coordinates are equal then children with smaller x coordinates occupy the least significant bits, and so on. Other predetermined orders could be used.

The two bit designation may also extend to identifying a node type as grey, black or white. This may be useful as four such nodes comprise a byte and may therefore be stored together. As will become apparent below, in some examples, octrees are merged or parts thereof are extracted. However, in various examples given below, a serialised representation may be adopted, for example in consideration of the layer-by-layer nature of object generation. As FIG. 2 illustrates, there are 4 nodes in a transverse region of the object at each resolution, and these nodes will be handled together in any data processing.

In other examples, other encoding such as Huffman encoding could be used.

As briefly mentioned above with relation to the volume B5, and as can readily be understood, if a B level volume is wholly interior to an object, then any sub-nodes thereof which may be formed would also be wholly interior to the object. Therefore, it may be the case that only 'grey' nodes, i.e. those which comprise a sub-region having an attribute a sub-region lacking the attribute, are stored. If the volume is white or black, it need not be stored as a node as the volume is characterised in the preceding node, and this characterisation extends to all descendants. For example, for an object which occupies a lower half of a volume, this could be fully characterised by a one level octree with a single node, with 4 white sub-volumes with higher z and 4 black sub-volumes with lower z. For example, a 16-bit string could characterise the root node (which describes a grey volume) as: 0000000001010101. This fully represents the whole object. If however one of the black or white sub-volumes was instead grey, a further node could be formed for that sub-volume, characterising the sub-volumes thereof.

In some examples, therefore, the octree may comprise nodes characterising grey volumes (as black and white node volumes need not be stored) and at voxel, or print resolution level, sub-volumes may be categorised as black or white. In other examples, a grey node may be any node which is sub-divided (even if the descendent nodes all have or lack an attribute). Black or white nodes may be those nodes which are not sub-divided.

In some examples, the sub-volume octrees may be defined to have a root node. If the sub-volume is wholly consistent (e.g. is a 'black' or a 'white') volume, it may nevertheless be maintained as a node. Thus, in some examples, the octree comprises only nodes which are made of octants of different categories except in the case of the root node of the sub-volume octrees, which may describe a volume which is entirely consistent.

Figure 3:
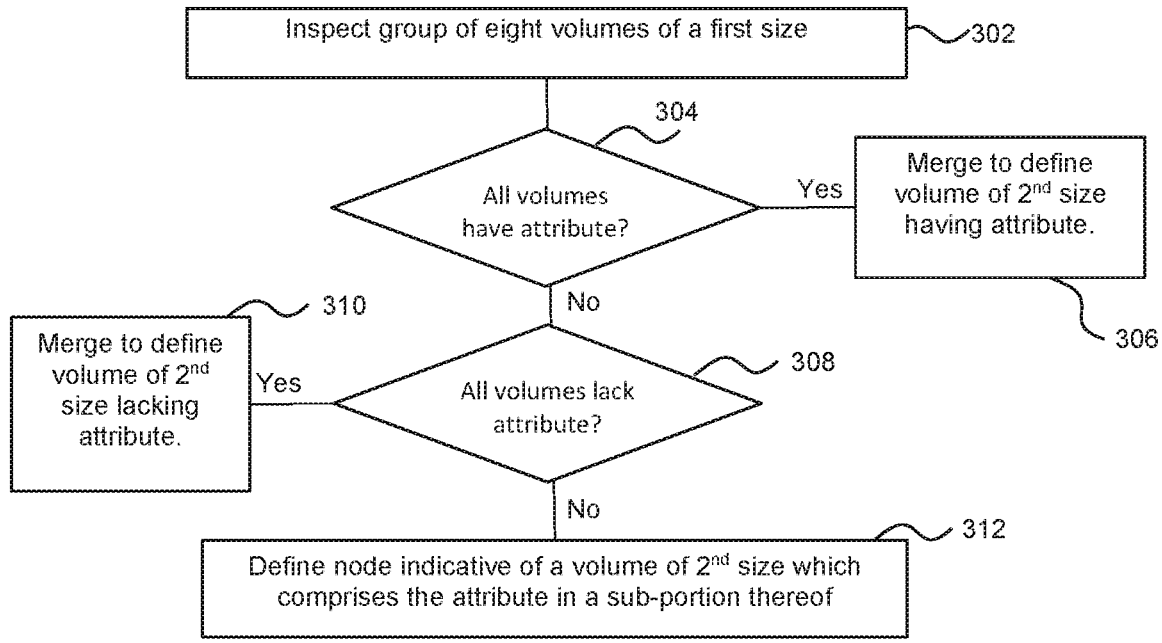
FIG. 3 is a flowchart of an example method for defining nodes in an octree.

FIG. 3 shows an example of a method, which may be a computer implemented method for building an octree representation of the object, and which may be employed in carrying out either of blocks 104 and 106 above. The method may be thought of as a 'bottom up' method of building an octree, which starts with smaller volumes.

Block 302 comprises inspecting groups of eight volumes of a first size in the data model. Such an inspection may be carried out in relation to a particular predetermined attribute (e.g. internal, conductive, particular color, etc.) In block 304 it is determined if the group consists wholly of volumes which share the predetermined attribute throughout their whole volume. If so, in block 306, the volumes are merged to define a volume of a second (larger, comprising the 8 times the volume) size which has the predetermined attribute. Otherwise, in block 308 it is determined if the group wholly consists of volumes which lack the predetermined attribute throughout their whole volume, in which case block 310 comprises merging the volumes to define a volume of the second size which lacks the predetermined attribute. If neither of these conditions is true, the group is mixed: some volumes of the first size have the attribute, at least in part, and some volumes of the first size lack the attribute, at least in part. In that case, block 312 comprises defining a node indicative of a volume of the second size which comprises the attribute in a sub-portion thereof. In each of the merger actions of block 306 and 310, the smaller volumes may be in effect discarded such that data relating specifically thereto is not retained, as such data would not contribute to the information available about the object.

However, when forming the node in block 312, the data describing the volumes of the first size may be retained, in order to distinguish between those volumes which comprise the attribute and those volumes which lack it. For example this data may be returned in a bit-string characterising a node, which may be a 16-bit string as described above.

When generating a sub-volume octree, the method of FIG. 3 may be carried out iteratively by inspecting volumes represented by nodes/volumes defined in a preceding iteration and forming new nodes/volume until a node or volume indicative of that sub-volume is formed, at which point the data may be stored, for example in a computer readable memory. As noted above, in some examples, the largest volume is stored as a node characterising its sub-volumes even if all of those sub-volumes share the attribute, or all of the sub volumes lack the attribute. The size of a sub-volume may be determined based on memory and processing capabilities. For example, the size of a sub-volume may be determined according to the number of sub-volumes which can be built in parallel by available processing apparatus, or the type of memory available to store the sub-volumes.

Such a sub-volume octree may be built in relatively fast access memory (such RAM), as the data may be accessed repeatedly throughout the procedure. The number of depth levels of the sub-volume octrees may be determined based on the available resources and the model complexity.

When generating a volume octree, the method of FIG. 3 may be carried out iteratively by inspecting volumes represented by nodes/volumes defined in a preceding iteration and forming new nodes starting with the nodes/volumes representing the sub-volumes, and continuing in some examples until a 'root node' is formed.

In some examples, there may be more than one sub-volume level. For example each volume characterised by a sub-volume octree may be described by split level octrees.

Determining an octree may comprise serialising the data wherein, as is set out in greater detail below, the serialised representation is constructed such that the nodes are ordered in a particular manner. This may be thought of as a 'Z-first' ordering, when considering XYZ space in which the Z coordinate relates to the height of the object as it is generated in layers lying in an XY plane. As will become apparent, such an ordering may be suited for processing data relating to a three dimensional object in layers.

In an example, the serialised representation conforms to three rules, which are discussed with relation to the 3-level octree shown in FIG. 2, which for the sake of this portion of the description may be an example of a volume octree or of a sub-volume octree). It may be remembered that B1, B2, B3 and B4 represent quadrants of the lower half of the volume whereas B5, B6, B7 and B8 relate to the upper half of the volume. Similarly, $C_n1$-$C_n4$ represent the lower half of each B volume for n=1 to 8.

The first rule to be applied in storing the serialised representation is that a node representing a volume which includes a layer of the object to be generated earlier in an intended order of object generation precedes a node representing a volume which consists of layer(s) of the object to be generated subsequently.

Taking the example of FIG. 2 (and assuming that all nodes exist within the octree), and on the basis that in additive manufacturing, an object is usually generated from its base upwards, in an example the layer to be generated first is the lower layer, which comprises $C_n1$-$C_n4$ for n=1 to 4. Nodes B1-B4 also include this layer, as does node A. Therefore, this rule means that A and B1-B4 will be listed before B5-B6

(which do not include a representation of the first layer). It also means that $C_n1$ to $C_n4$ for n=1 to 4 will be listed before all other C nodes.

The second rule is that nodes representing a volume which includes a given layer of the object are ordered based on the level of the nodes within the octree representation, wherein parent nodes appear before descendent nodes. Thus, for the first layer, A will be listed before any of B1 to B4 and that B1 to B4 will be listed before $C_n1$ to $C_n4$ for n=1 to 4.

The third rule is that, after the first and second rules have been applied, i.e. for nodes representing a volume which includes a given layer of the object and being of the same level within the octree, nodes are serialised according to a location encoding pattern. For example, this may be Morton (Z-order) code or the like which would define a particular path through the space. A Morton code is one example of a function which maps multidimensional data to one dimension while preserving locality. In this example, the location encoding pattern may therefore be applied to determine the order of B1 to B4 and of $C_n1$ to $C_n4$ for n=1 to 4.

As noted above, for the first layer of the object, this would result in an order of A, B1-4 (ordered according to the location encoding pattern), $C_n1$-$C_n4$ for n=1 to 4 (ordered according to the space encoding pattern). This gives a first portion of a serialised representation. For ease of representation, the location encoding pattern in indicated in square brackets and this portion could be summarised as:

A:[B1-B4]:[$C_n1$-$C_n4$]$_{n=1-4}$

The next layer up not yet included comprises $C_n5$-$C_n8$ for n=1 to 4. However, this layer is also represented by B1-B4 and A, therefore representing this layer simply means adding $C_n1$-$C_n4$ for n=5 to 8 to the end of the code portion above, as this breaks none of the rules, extending the serialised representation as follows:

A:[B1-B4]:[$C_n1$-$C_n4$]$_{n=1-4}$:[$C_n5$-$C_n8$]$_{n=1-4}$

The next layer up not yet included includes parts of B5-B8, which should be included before their descendent nodes. This gives, in this example, a serialised representation of the object contained in the volume A as follows:

A:[B1-B4]:[$C_n1$-$C_n4$]$_{n=1-4}$:[$C_n5$-$C_n8$]$_{n=1-4}$:[B5-B8]:[$C_n1$-$C_n4$]$_{n=5-8}$:[$C_n5$-$C_n8$]$_{n=5-8}$

If another level, i.e. a "D" level, was added, the nodes would be inserted after their corresponding 'C' level representations according to the Z-first ordering.

As has been mentioned, in some examples, it may be that, in some cases, some nodes are not defined if they represent sub-volumes which all have or all lack an attribute (and are not root nodes of a sub-volume octree), so some nodes may be missing from the representation as described above.

Such a data structure is well suited to three dimensional printing as the data which describes a particular layer of an object is concatenated. This may be contrasted with an octree representing in level order (which may be term 'breadth-ordering), in which, under the same notation, the description of the object may be as follows:

A:[B1-B8][$C_11$-$C_18$]: . . . :[$C_81$-$C_88$]

Another possible representation of the data may be a 'depth first' ordering, which could be expressed as follows:

A:B1:$C_11$-$C_18$:B2:$C_21$-$C_28$:B3:$C_31$-$C_38$ . . . B8:$C_81$-$C_88$

In such representations, the description of the first layer to be manufactured, $C_n1$-$C_n4$ for n=1-4, is dispersed throughout the data and retrieving the data becomes complicated. Moreover, as will become apparent from the discussion which follows, such representations do not allow data retrieved in relation to one layer to be of assistance in retrieving data in relation to subsequent layer.

In the above examples, the node representing the root node A is arranged first in the serialisation.

The data is 'arranged' into a serialisation in the sense that a data reader will understand that the data is associated with the specified order. In some examples, the data may be physically dispersed on a storage medium (for example, a random access storage medium). However, the data is stored so as to have a relationship, in which the described arrangement of the data is encoded.

Figure 4:
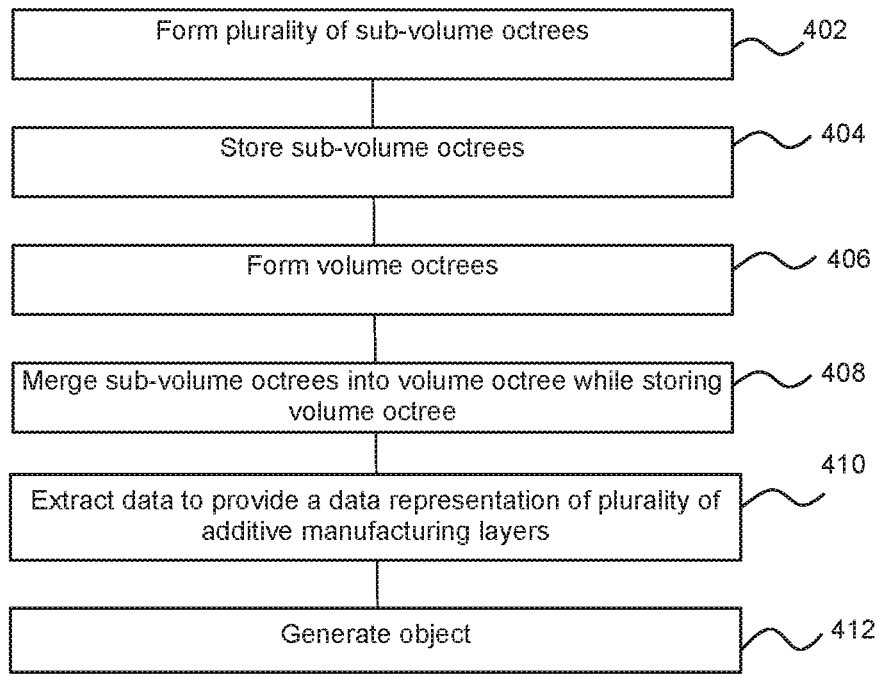
FIG. 4 is a flowchart of an example method for generating an object using additive manufacturing.

FIG. 4 is an example of a method, which may be a method of providing an octree representation of an object, and which may be a computer implemented method.

Block 402 comprises forming a plurality of sub-volume octrees, in this example using the "Z-first" serialised representation described above, and each sub-volume octree is independently stored in a machine readable medium as a data object in block 404. Block 406 comprises forming a volume octree (also using the serialised representation), and block 408 comprises merging the volume octrees and the sub-volume octrees by inserting each sub-volume octree into the volume octree while storing the volume octree in a machine readable medium as a data object. The merger can be carried out simply by inserting the root nodes of the sub-volume octrees, and any descendent nodes thereof, between the final nodes of the volume octree. Such a merged serialised representation would also conform to the 'Z-first' order described above.

In an example, there may be around 10 to 14 depth levels in a merged octree. If the 14th depth level of the octree is complete (i.e. the octree contains all the possible nodes at that depth level), this would mean that around $5 \times 10^{12}$ nodes would be stored. When building such an octree, an in-memory representation is practical as long as the data storage specifications are not too high.

Where an octree node comprises 16 bits (2 bytes), the aforementioned example would require around $(2^{14})^3 * 2$ Bytes=8796 GB of RAM, which represents considerable computing resources While 16 bit nodes have been described above, pointers may be used to define the structure of a node, which means that in practice, nodes can be around 34 bytes. In addition, the 16 bit node described encodes just one property. A data model of an object may have a number of properties and therefore, in practice, the resource specifications may be substantially higher.

Thus even a relatively simple object may result in a significant amount of data to store and process, and this could be outside the scope of current conventional readily accessible hardware, exceeding 'off-the-shelf' processing resource specifications. In such examples, a multilevel approach may ease the processing resource specifications for in-memory processing.

For example, if the octree is split so that the first 6 levels are represented in a volume octree and 64×64×64 sub-volume octrees are defined, each octree would comprise around $20 \times 10^6$ nodes, which may be efficiently handled 'in core', i.e. in RAM, or in available fast memory resources.

Block 410 comprises extracting data from the second data to provide a data representation of each of a plurality of layers to be generated in additive manufacturing and block 412 comprises generating an object based on the data representation.

The Z-first order may allow for efficient data extraction for object generation in block 412. In some examples, the serialised data may be stored in memory and portions thereof may be retrieved in order to perform processing to determine control instructions for generating an object (for example, in order to determine instructions which specify where build materials and/or print agents may be placed, what materials/agents to use, what parameters such as temperatures, etc. may be used).

To consider an example, to generate the lowest layer of an object, data representing all nodes which contain at least a portion of the first layer may be extracted from the serialised representation. For the purpose of this discussion, in this example, a first layer corresponds to the lower C nodes and a second layer corresponds to the higher C-nodes, although in other examples, each of these nodes may be split into sub-volumes representing more than one layer.

Considering the example of FIG. 2, all the nodes which contain a portion of the lowest layer of the object are arranged in a single string, which may be expressed as:

A:[B1-B4]:[$C_n1$-$C_n4$]$_{n=1\text{-}4}$

This representation assumes that all the 'C-level' nodes are included in the octree. This may not be the case, as one of the B nodes may indicate that a sub-volume thereof is homogenous in terms of the attribute under consideration, and therefore there may be no C-level node corresponding to that sub-volume.

A representation of the first layer may be determined from the extracted data. For example, this may comprise extracting the nodes [$C_n1$-$C_n4$]$_{n=1\text{-}4}$, which provide information about each of a number of sub-volumes thereof. If any of the C nodes are not defined, determining a representation of the first layer may comprise considering the content of a higher level, i.e. in this example, a B or the A node, node. In some examples, the determined representation of the first layer may be at an object generation resolution. In examples which include terminal grey volumes, determining the representation of the first layer may comprise assigning each volume as a black or a white volume. In some examples, the representation of the first layer may be used as an input to generate control instructions for an additive manufacturing apparatus. For example, the characterisation of a volume as being interior to the object may result in an instruction to place a fusing agent at a physical location corresponding to that volume. The characterisation of a volume as being wholly external to the object may result in an instruction to place no fusing agent, or to place a detailing agent, at a physical location corresponding to that volume.

In some examples, the control instructions may be used to generate an object by an additive manufacturing apparatus, and an object layer using the representation of the first layer.

A data block comprising the extracted data and an index indicative of a location of data in serialised representation which is not contained in the extracted data may be stored in a memory. This data block may for example comprise a 'struct' as the term in used in the C programming language (amongst others). The index may comprise a pointer indicating the last extracted node, or the first 'unextracted' node in the serialised data.

As such a data block may be relatively small when compared to the serialised representation of the object, it may in practical terms be held in a relatively fast in-core, or a processor memory, as opposed to a slower memory resource (for example, 'off-core' or solid state memory).

A data representation of a second layer of the object to be generated in the layer by layer manufacturing process may then be generated. For example, this may be the layer to be generated immediately after the first layer (i.e., the second layer will lie directly on top of the first layer in the physically generated object), or may be a subsequent layer. In examples where the C-level nodes represent more than one layer, the data for generating such a layer may be contained within the already extracted data, and therefore this method may be carried out for an appropriate subsequent layer. However, in this example, the second layer corresponds to the higher C-nodes.

This may be generated by first accessing the data block. As noted above, this data block may in some examples be held in local, "in-core" or fast memory as it is relatively small. This could result in a reduction of memory access delay, which for large data files can be significant. Data representing any nodes which do not represent any portion of the second layer may be discarded. In this example, this leaves the data:

A:[B1-B4]

The index may be used to determine a start location in the serialised data. In this example, the index may be a pointer to the position in the serialised data which was last read, in this example, location "Loc" below. In practice, this may be a pointer to the end of the data portion which was extracted, or to the start of the subsequent data which has not been extracted.

A:[B1-B4]:[$C_n1$-$C_n4$]$_{n=1\text{-}4}$:*Loc*:[$C_n5$-$C_n8$]$_{n=1\text{-}4}$:[B5-B8]:[$C_n1$-$C_n4$]$_{n=5\text{-}8}$:[$C_n5$-$C_n8$]$_{n=5\text{-}8}$ Data representing all nodes which represent at least a portion of the second layer and which appears after the start location may be extracted from the serialised representation. This may be used, along with the retained data from the data block to generate a representation of the second layer. In this example, the data on which it is based is:

A:[B1-B4]: [$C_n5$-$C_n8$]$_{n=1\text{-}4}$ (as noted above, this is to the extent that the B and C nodes exist).

An object layer may then generated using the representation of the second layer, while an updated data block comprising the data retained from the first data block and the data extracted for the second layer, along with a pointer to a new location, is stored in a memory. In this example, the pointer would be a pointer to the location indicated as *Loc*:

A:[B1-B4]:[$C_n1$-$C_n4$]$_{n=1\text{-}4}$:[$C_n5$-$C_n8$]$_{n=1\text{-}4}$:*Loc*:[B5-B8]:[$C_n1$-$C_n4$]$_{n=5\text{-}8}$:[$C_n5$-$C_n8$]$_{n=5\text{-}8}$ This process may be carried out iteratively, layer after layer in the intended order of manufacture, with an updated data block being created and used for the next layer until data relating to the final layer is retrieved. In this example, the next layer up is in the regions B5-B8 and not B1-B4, so the data to be discarded would leave just node A from the previous data block, and the next data string to be extracted would comprise [B5-B8]: [$C_n1$-$C_n4$]$_{n=5\text{-}8}$.

As has been discussed above, a data block may be held in an in-core, or relatively fast memory resource (for, example, local RAM) and accessed with relative efficiency. The serialised representation may be held in an "off-core" high capacity memory resource such as a solid state memory resource. Data extraction tasks for such a high capacity memory, which may be relatively slow in terms of data access times, are effectively dispersed throughout the processing to generate the layers. In the above example, the method is carried out during object generation, in which case it may contribute to providing substantially constant layer processing times which are not unduly lengthy. Data processing for a subsequent layer may carried out while generation of a preceding layer is ongoing.

To consider the effect of layer processing times, an example additive manufacturing process may involve various processes. A layer of build material may be formed on a print bed, or build platform. The layer of build material may be formed using, for example, a build material distributor, which may deposit and spread build material onto the print bed at an intended thickness.

The layer of build material may be preheated using, for example, a radiation source such as an infrared lamp, or by some other means. Print agent may be distributed onto the layer of build material by an agent distributor. Energy, for example heat from a fusing lamp or from multiple fusing lamps, may be applied to the layer of build material so as to cause coalescence and solidification of those portions of build material to which fusing agent has been applied. In a further example, the layer of build material may be allowed to settle and cool down.

The processes described above with reference to an example additive manufacturing process may form part of a layer processing cycle which may be repeated for each layer of a multi-layered object to be generated. The layer processing cycle, or layer generation cycle, may be considered to include a set of processes performed in respect of a single layer of build material so as to form a slice of the three-dimensional object to be built, and the time to perform the set of processes in respect of a single layer of build material may be considered to be a layer processing time, or layer generation time. This may include the processing time for generating the instructions to be used in forming the layer, for example specifying the placement of print agent, a temperature or the like, which may be based on data extracted from a representation of the object.

It may be intended that the layer processing time is the same or approximately the same for all of the layers of an object to be generated. That is to say, the layer processing time for each layer in an additive manufacturing process may be approximately constant or fixed. Here, the expression "the same" is intended to mean exactly the same or approximately the same.

Maintaining a constant or approximately constant layer processing time for all layers of an object to be generated helps to ensure that the object is generated with consistent layers.

By storing the data in the serialised manner described, the retrieval thereof may effectively be 'amortised' throughout data processing, and constant layer processing times which are not unduly long may be more readily achieved. In some case processing of a subsequent layer may start while generation of a preceding layer is on-going.

Figure 5:
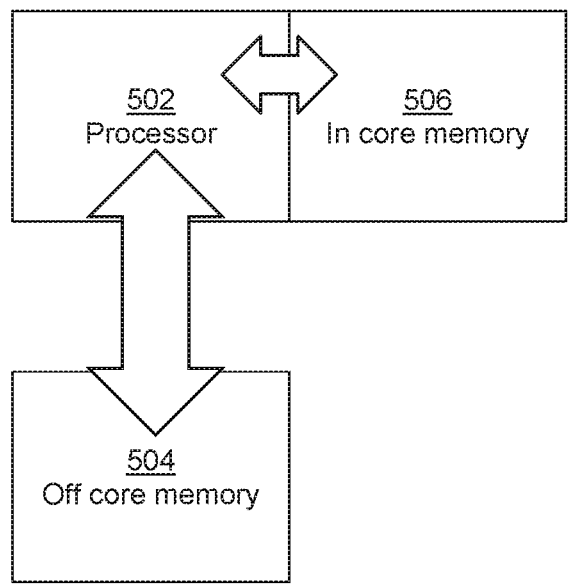
FIG. 5 is a schematic drawing of an example processing apparatus.

FIG. 5 shows a schematic representation of a computer system comprising a processor 502, an off-core memory 504 and an in-core memory 506. The off-core memory 504 and in-core memory 506 may respectively comprise a 'remote' and a 'local' memory, where those terms should be understood in terms of data retrieval for the processor: an in-core memory 506 may be accessed more quickly than an off-core memory 504. An off-core memory 504 may for example be structured for efficient bulk storage of data, whereas an in-core memory may be configured to provide data substantially on demand. To that end, the memories 504, 506 may be of different types. For example, the off-core memory 504 may comprise a solid state memory, for example a Hard Disk Drive HDD or a Solid State Drive (SSD), whereas the in-core memory may comprise Random Access Memory (RAM). In other examples, the off-core memory 504 may comprise a read-only memory.

In some examples, the in-core memory 506 may be physically closer to the processor 502 (in order to allow for shorter signal paths), and may be physically smaller than the off-core memory 504. In some examples, the processor 502 may be connected to the off-core memory 504 via a computer network, such as a Local Area Network, a Wde Area Network, or the internet, whereas the in-core memory may be arranged in or near the apparatus comprising the processor 502. In some examples, the in-core memory 502 may be provided on the same chip or die as the processor, or the processor may be a 'processing in memory' processor. In some examples, the memories 504, 506 could be substantially co-located.

In some examples, the serialised data may be stored in the off-core memory 504 and the data block comprising just those portions of the data relating to a particular layer may be stored in the in-core memory 506. It may be noted that, once the data block for the first layer has been formulated, at least some data relating to the second layer has already been retrieved from the off-core memory 504. The relatively slow retrieval of data is spread throughout the data retrieval and processing (and in some examples, throughout an object generation exercise). In some examples, the sub-volume octrees may be formed in the in-core memory 506.

Figure 6:
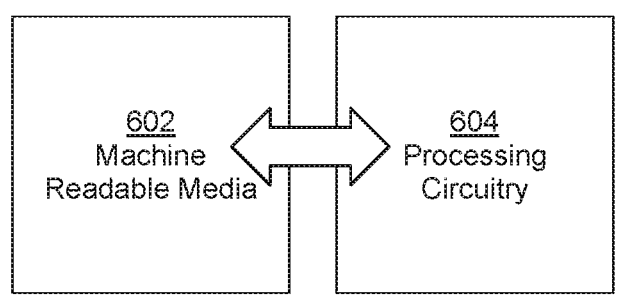
FIG. 6 is a schematic drawing of an example processor in conjunction with a machine readable medium.

FIG. 6 shows a machine readable medium 602 and a processor 604. The machine readable medium 602 comprises instructions which, when executed by a processor, cause the processor to generate a data model representing an object to be generated in layer-by-layer manufacturing.

The instructions comprises instructions to generate a plurality of first data models representing an object to be generated in layer-by-layer manufacturing by inspecting groups of eight volumes of a first size, and, for each group:
(i) if the group consists of volumes which share a predetermined attribute, merging the volumes to define a volume of a second size which has the predetermined attribute; otherwise, (ii) if the group consists of volumes which lack the predetermined attribute, merging the volumes to define a volume of the second size which lacks the predetermined attribute, and otherwise (iii) defining a node indicative of a volume of the second size which comprises the attribute in a sub-portion thereof. In some examples, the instructions may comprise instructions to carry out the method of FIG. 3.

The instructions may be such that the formation of nodes/volumes is carried out iteratively based on inspecting volumes represented by nodes/volumes defined in a preceding iteration until a data set comprising a representation of the formed nodes reaches a threshold size. In some examples, if a node has not previously been identified, the largest volume may in any case be encoded as a node.

The instructions may further comprise instructions to cause the processor 604 to store the plurality of first data models (for example, in a memory) and to generate a second data model, wherein generating the second data model comprises, starting from the nodes/volumes representing the largest volumes formed in generating the first data models, inspecting groups of eight volumes of a first size, and, for each group, (i) if the group consists of volumes which share a predetermined attribute, merging the volumes to define a volume of a second size which has the predetermined attribute, otherwise (ii) if the group consists of volumes which lack the predetermined attribute, merging the volumes to define a volume of the second size which lacks the predetermined attribute, otherwise (iii) defining a node indicative of a volume of the second size which comprises the attribute in a sub-portion thereof. The formation of nodes/volumes may be carried out iteratively based on inspecting volumes represented by nodes/volumes defined in a preceding iteration until a single node is indicative of a volume containing the object.

The machine readable medium 602 may further comprise instructions which, when executed by a processor 604, cause the processor 604 to merge the first and second data models by interleaving the plurality of first data models into the second data model, for example as described in relation to FIG. 4.

The machine readable medium 602 may further comprise instructions which, when executed by a processor 604, cause the processor 604 to generate the first and second data models such that, in each data model:
(i) a node representing a volume which includes a layer of the object to be generated earlier in an intended order of object generation precedes a node representing a volume which consists of layer(s) of the object to be generated subsequently;
(ii) for nodes representing a volume which includes a given layer of the object, nodes at a coarser volumetric resolution precede nodes at a finer volumetric resolution; and
(iii) nodes representing a volume which includes a given layer and being of the same resolution are serialised according to a predetermined location encoding pattern.

In other words, the data models may each comprise a "Z-first" data model as described above.

Figure 7:
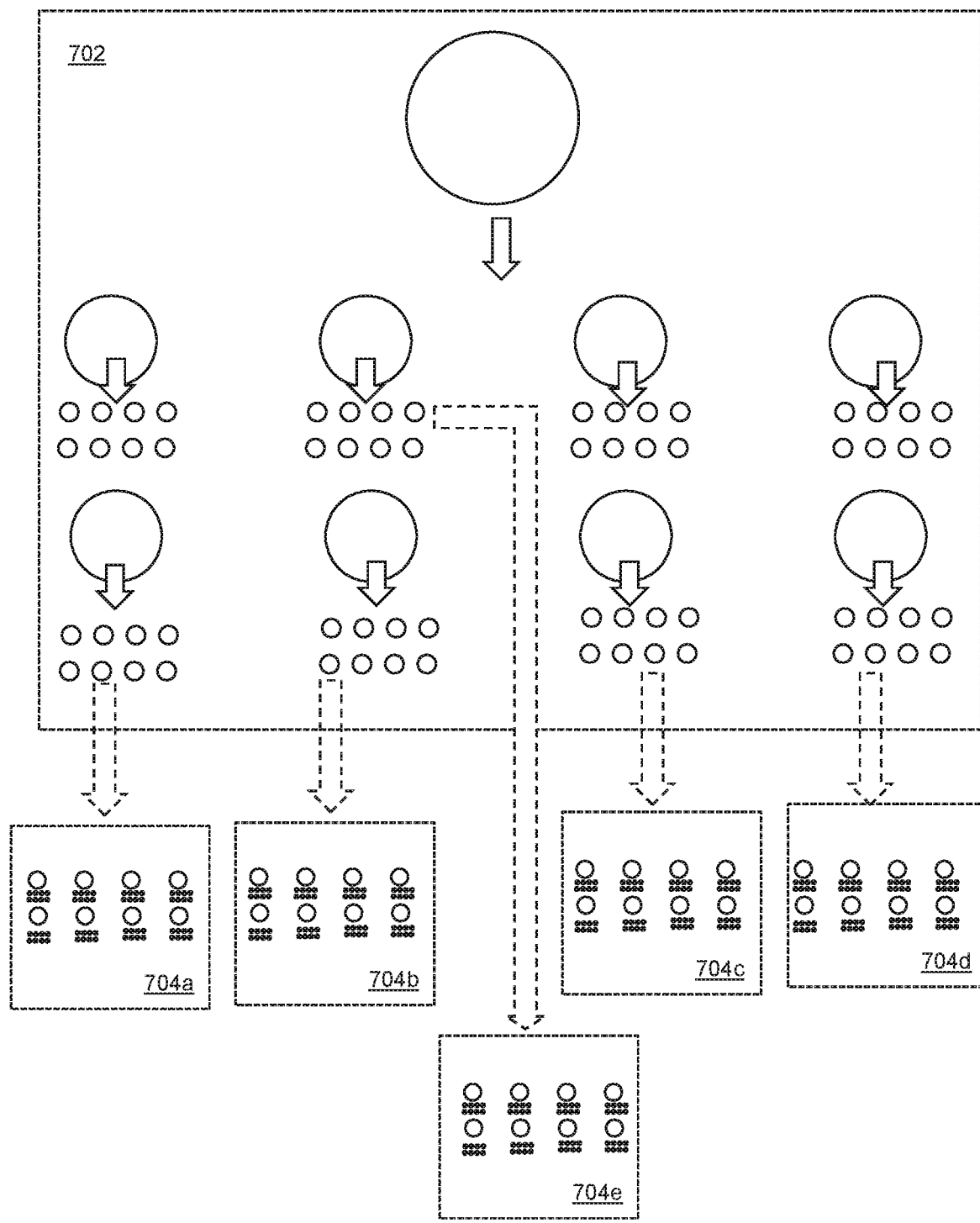
FIG. 7 is a schematic drawing illustrating a multilevel octree structure.

FIG. 7 shows a representation of at least part of an object to be manufactured in a layer-by-layer manufacturing process, wherein the representation comprises: data representing an octree 702 having first plurality of nodes spanning volumetric resolutions of the object between a first resolution and a second resolution (in this example, three volume resolutions) and data representing each of plurality of octrees 704a-n having second plurality of nodes spanning volumetric resolutions of the object between a third resolution and a fourth resolution (in this example a further two volume resolutions). It will be appreciated the octree 702 may have up to 64 octrees 704a-n having second plurality of nodes associated therewith. The octree 702 with nodes spanning volumetric resolutions of the object between a first resolution and a second resolution may comprise a volume octree and octrees 704 having nodes spanning volumetric resolutions of the object between a third resolution and a fourth resolution may comprise sub-volume octrees.

Within a serialised representation of each octree 702, 704, the nodes may be ordered such that a node representing a volume which includes a layer of the object to be generated earlier in an intended order of object generation precedes a node representing a volume which consists of layer(s) of the object to be generated subsequently, for nodes representing a volume which includes a given layer of the object, nodes at a coarser volumetric resolution precede nodes at a finer volumetric resolution; and nodes representing a volume which includes a given layer and being of the same resolution are serialised according to a predetermined location encoding pattern (i.e. the data is ordered according to a 'Z-first' order as described above). Such a data structure is suited to 'amortised' data retrieval in additive manufacturing processes, as described above.

In some examples, each node of the octree is represented by a bit-string of a predetermined common length and categorises a plurality of sub-volumes as one of:
(i) having a consistent predetermined attribute throughout the sub-volume,
(ii) lacking the predetermined attribute throughout the sub-volume
(iii) having the predetermined attribute in a sub portion of the sub-volume.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted, and at least some processes may be carried out in parallel. Blocks described in relation to one flow chart may be combined with those of another flow chart. It shall be understood that at least some flows in the flow chart, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
receiving, at a processor, a first data model of an object;
generating using the processor, a second data model, wherein generating the second data model comprises building a volume octree in a bottom up manner that starts with sub-volumes and proceeds to form a larger volume, the building of the volume octree comprising:
generating, for each respective sub-volume of a plurality of contiguous, non-overlapping sub-volumes of a volume containing the object, a respective sub-volume octree characterising the respective sub-volume and having a root node, the generating producing a plurality of sub-volume octrees for the plurality of continuous, non-overlapping sub-volumes; and
generating the volume octree characterising the volume containing the object based on merging sub-volume octrees of the plurality of sub-volume octrees, the volume octree characterising in its lowest nodes the root nodes of the plurality of sub-volume octrees.

2. The method of claim 1, wherein the generating of the volume octree comprises:
inspecting groups of eight sub-volumes of a first size in the first data model, and
for each respective group of the groups:
in response to determining that the respective group includes sub-volumes that share a predetermined attribute, merging the sub-volumes of the respective group to define a volume of a second size that has the predetermined attribute;
otherwise, in response to determining that the sub-volumes of the respective group lack the predetermined attribute, merging the sub-volumes of the respective group to define a volume of the second size that lacks the predetermined attribute; and
otherwise, defining a node indicative of a volume of the second size that comprises the predetermined attribute in a sub-portion thereof.

3. The method of claim 2, wherein the predetermined attribute comprises an indication of whether a sub-volume is entirely interior to the object.

4. The method of claim 2, wherein generating a sub-volume octree of the plurality of sub-volume octrees comprises inspecting sub-volumes defined in a preceding iteration and defining new sub-volumes until a root node is defined.

5. The method of claim 4, further comprising storing a sub-volume octree of the plurality of sub-volume octrees.

6. The method of claim 1, further comprising:
extracting data from the second data model to provide a data representation of each of a plurality of layers to be generated in additive manufacturing; and
generating the object based on the data representation.

7. The method of claim 1, wherein the merging of the sub-volume octrees comprises merging the sub-volume octrees that share an attribute.

8. The method of claim 1, wherein the merging of the sub-volume octrees comprises merging the sub-volume octrees that lack an attribute.

9. A non-transitory machine-readable storage medium comprising instructions that upon execution cause a system to:
receive a first data model of an object;
generate a second data model, wherein generating the second data model comprises:
generating, for each respective sub-volume of a plurality of contiguous, non-overlapping sub-volumes of a volume containing the object, a sub-volume octree characterising the respective sub-volume and having a root node; and
generating a volume octree characterising the volume containing the object, the volume octree characterising in its lowest nodes the root nodes of the sub-volume octrees,
wherein generating an octree of the plurality of sub-volume octrees or the volume octree comprises forming a serialised octree representation of the object such that, in the serialised octree representation of the object, nodes are ordered such that
a node representing a sub-volume that includes a layer of the object to be generated earlier in an intended order of object generation precedes a node representing a sub-volume including a layer of the object to be generated subsequently;
nodes representing a sub-volume that includes a given layer of the object are ordered based on a level of the nodes within the octree, wherein parent nodes appear before descendent nodes; and
nodes representing a sub-volume that includes a given layer of the object and being of a same level within the octree are serialised according to a location encoding pattern.

10. The non-transitory machine-readable medium of claim 9, wherein the location encoding pattern is a Morton code pattern.

11. A non-transitory machine-readable medium comprising instructions that upon execution cause a system to:
receive a first data model of an object;
generate a second data model, wherein generating the second data model comprises building a volume octree in a bottom up manner that starts with sub-volumes and proceeds to form a larger volume, the building of the volume octree comprising:
generating, for each respective sub-volume of a plurality of contiguous, non-overlapping sub-volumes of a volume containing the object, a respective sub-volume octree characterising the respective sub-volume and having a root node, the generating producing a plurality of sub-volume octrees for the plurality of continuous, non-overlapping sub-volumes; and
generating the volume octree characterising the volume containing the object based on merging sub-volume octrees of the plurality of sub-volume octrees, the volume octree characterising in its lowest nodes the root nodes of the plurality of sub-volume octrees.

12. The non-transitory machine-readable medium of claim 11, wherein generating an octree of the plurality of sub-volume octrees comprises forming the octree such that:
a node representing a sub-volume that includes a layer of the object to be generated earlier in an intended order of object generation precedes a node representing a volume including a layer of the object to be generated subsequently;
for nodes representing a sub-volume that includes a given layer of the object, nodes at a coarser volumetric resolution precede nodes at a finer volumetric resolution; and nodes representing a sub-volume that includes a given layer and being of a same resolution are serialised according to a predetermined location encoding pattern.

13. The non-transitory machine-readable medium of claim 11, wherein the instructions upon execution cause the system to generate, based on the second model, a representation of at least part of an object to be manufactured in a layer-by-layer manufacturing process.

14. The non-transitory machine-readable medium of claim 11, wherein each node of a sub-volume octree is represented by a bit-string of a predetermined common length and categorises a respective sub-volume as one of:
- having a consistent predetermined attribute throughout the respective sub-volume,
- lacking the predetermined attribute throughout the respective sub-volume, or
- having the predetermined attribute in a sub-portion of the respective sub-volume.

15. The non-transitory machine-readable storage medium of claim 11, wherein the generating of the volume octree comprises:
- inspecting groups of eight sub-volumes of a first size in the first data model, and for each respective group of the groups:
  - in response to determining that the respective group includes sub-volumes that share a predetermined attribute, merging the sub-volumes of the respective group to define a volume of a second size that has the predetermined attribute;
  - otherwise, in response to determining that the sub-volumes of the respective group lack the predetermined attribute, merging the sub-volumes of the respective group to define a volume of the second size that lacks the predetermined attribute; and
  - otherwise, defining a node indicative of a volume of the second size that comprises the predetermined attribute in a sub-portion thereof.

16. The non-transitory machine-readable storage medium of claim 15, wherein generating a sub-volume octree of the plurality of sub-volume octrees comprises inspecting sub-volumes defined in a preceding iteration and defining new sub-volumes until a root node is defined.

17. The non-transitory machine-readable storage medium of claim 11, wherein the merging of the sub-volume octrees comprises merging the sub-volume octrees that share an attribute.

18. The non-transitory machine-readable storage medium of claim 11, wherein the merging of the sub-volume octrees comprises merging the sub-volume octrees that lack an attribute.

* * * * *